United States Patent Office 2,990,846
Patented July 4, 1961

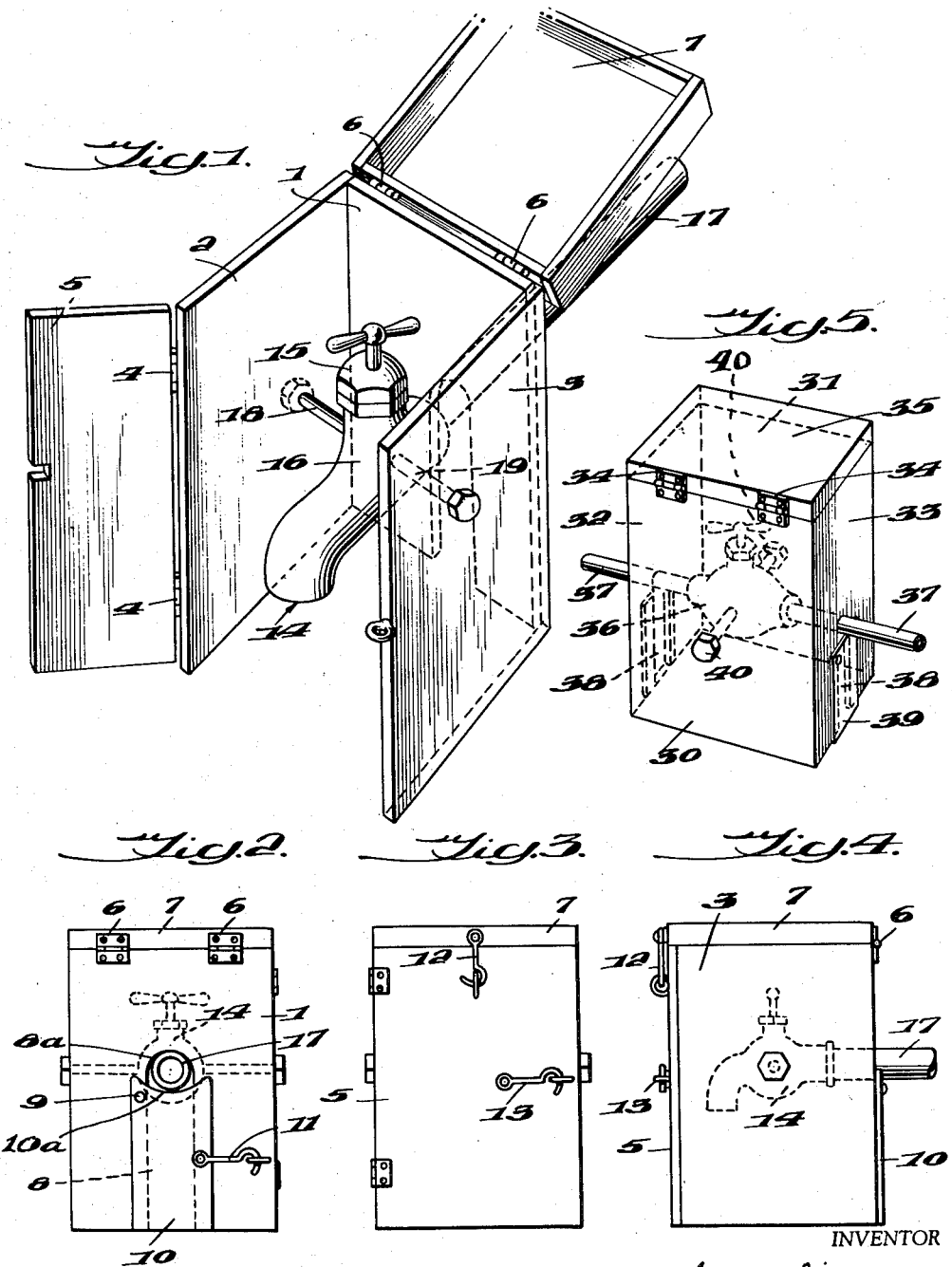

2,990,846
VALVE REPAIR APPARATUS
Isaac Rives, Edificio Naroca Apto. 300, Linea y Paseo (Vedado), Havana, Cuba, assignor of twelve and one-half percent to Florencia Ruiz de Rives, Havana, Cuba; twelve and one-half percent to Mercedes K. de Llerena, twelve and one-half percent to Pablo Llerena, both of Mexico City, Mexico; and twelve and one-half percent to Carlos M. Kohly, Marianao, Cuba
Filed Oct. 9, 1959, Ser. No. 845,461
1 Claim. (Cl. 137—377)

This invention relates generally to an apparatus which permits the replacement of the gasket of a fluid control valve without necessitating the cut-off of the fluid line containing the valve, and more particularly to a housing which is removably clamped onto a fluid control valve to partially enclose the same when the valve bonnet is removed to divert the ejected fluid in a desired given direction.

In various fluid delivery installations it is often desired to replace the fluid control valve washers or gaskets which have been worn during prolonged use. While normally this is accomplished after cutting off the main fluid supply valve, in many installations, for one reason or another, it is not possible to completely interrupt the entire fluid service to permit repair of a branch line valve. For example, in many rural installations the fluid system may not be provided with a main cut-off valve, and in many other installations—such as shipboard, hospital, and chemical processing installations, for example—interruption of the entire fluid system or one branch thereof is not possible or feasible.

Ordinarily, when the bonnet of a valve or faucet is removed without interruption of the fluid to the valve, the fluid under pressure will be emitted in all directions from the opening in the valve body made by the removal of the bonnet (and the valve stem and gasket connected thereto), thus causing undesirable wetting of the repairman and the surrounding vicinity. The present invention is directed toward avoiding this uncontrolled discharge from the partially disassembled valve when the fluid supply to the valve is not interrupted.

Thus the primary object of my invention is to provide a valve repairing apparatus adapted to be removably clamped onto a valve body to partially enclose the same when the valve bonnet is removed for gasket replacement.

A more specific object of my invention is to provide a valve repairing device adapted to be clamped to a valve body connected in a fluid supply line, said device having a side wall through which the fluid conduit removably extends, a hingedly connected top member providing access to the interior of the device, and clamping means connecting the device to the valve body.

Other objects and advantages of my invention will become apparent from a study of the following specification when considered in conjunction with the accompanying drawings in which:

FIG. 1 is a perspective view of the gasket changing apparatus clamped upon a faucet valve;

FIG. 2 is a rear view of the apparatus of FIG. 1;

FIGS. 3 and 4 are front and side views of the apparatus of FIG 1; and

FIG. 5 is a perspective view of another embodiment of the invention adapted for use with a series-connected flow control valve.

Referring first more particularly to FIGS. 1–4, the valve repair housing consists of rear wall 1 to which are rigidly secured the side walls 2 and 3. Hingedly connected to the side wall 2 by hinge means 4 is the front wall 5, and hingedly connected to the rear wall 1 by hinge means 6 is the top member 7.

As shown in FIG. 2, the rear wall 1 has a centrally located slot 8 in the lower portion thereof which terminates at its upper end in a rounded portion 8a. Pivotally connected to the rear wall 1 by pivot 9 is the conduit closure plate 10 adapted to be latched in the position shown in FIG. 2 by the latch means 11. The closure plate 10 has a concave rounded upper portion 10a, as shown.

When the top member 7 is closed downwardly to the position of FIGS. 2–4 to be seated upon the walls 1, 2, 3 and 5, it may be latched in position by means of the latch means 12, and in the same manner, the front wall 5 may be secured to the side wall 3 by means of the latch means 13.

The operation of the device may now be described. When it is desired to change the valve gasket of faucet valve 14 by removing the bonnet 15 from the valve body 16, the closure plate 10 is pivoted in the clockwise direction about pivot pin 9 to completely expose slot 8 in the rear wall 1 and the housing is then fitted downwardly upon the valve 14 with the fluid conduit 17 extending within slot 8. When the conduit 17 abuts the rounded upper portion 8a of slot 8, the closure plate may be rotated in the counterclockwise direction and locked in the position of FIG. 2 by the latch means 11. The opening of slot 8 in the rear wall 1 will thus be closed by the closure plate 10.

The housing is then clamped to the valve body 16 by means of the oppositely-arranged inwardly-directed bolt means 18, 19 which are threadably mounted in the side walls 2 and 3, respectively. The bolt means 18 and 19 are tightened upon the valve body 16 and the housing will be held immobile on the valve 14 by the extremities of the bolt means 18 and 19 and the cooperation of the rounded surfaces 8a of slot 8 and 10a of the closure plate 10 with the fluid supply conduit 17. The front wall 5 is then locked in place by means of the latch 13.

The bonnet 15 is then removed from the valve body 16 by suitable tool means, after which the top member 7 is pivoted downwardly to completely enclose the upper portion of the valve 14. Fluid emitted from the opening in the valve body 16 caused by the removal of the bonnet 17 therefrom will be directed against the top member 7, the side walls 2 and 3, and the front and rear walls 5 and 1, and will fall by gravity through the lower end of the housing into a container positioned therebeneath.

As an alternative, it should be mentioned that it is possible to loosen the bonnet 15 from the valve body 16 with the front door 5 in the open position and the top member 7 in either the open or closed position, depending on the type of tools used and on the degree of difficulty in removing the bonnet from the valve body. In any event, once the bonnet has been removed, the top member 7 and the front wall 5 are closed to their positions of FIGS. 2–4 until the gasket has been replaced upon the valve stem.

To reassemble the valve, the latch means 12 is released and the top member 7 is hingedly opened to provide access to the valve, whereupon the bonnet is quickly connected again to the valve body. If desired as an alternative, the top member 7 can be left closed and the front wall 5 may be opened to provide access to the valve for this reassembly step.

The clamping bolts 18 and 19 are then released and the closure plate 10 is unlocked and pivoted in the clockwise direction, whereupon the housing may be lifted upwardly from the repaired valve Referring now to the embodiment of FIG. 5, the rectangular housing consists of rigidly connected side and end walls 30, 31, 32 and 33, respectively, to which is hingedly connected by hinge means 34 the top member 35. The full flow valve 36 is connected in series with the fluid conduit 37. Each end wall has a centrally-arranged slot 38 in the lower portion thereof which is covered by the pivotally mounted closure plate 39 in the manner of the slot 8 and closure plate 10 of the embodiment of FIGS. 1–4. Oppositely-arranged inwardly directed bolt means 40 threadably mounted in the side walls 30, 31 are provided for clamping the housing to the valve.

In use, the closure plates 39 are pivoted to expose the slots 38 and the housing is fitted downwardly upon the valve with the conduit 37 extending within the slots 38. The closure plates are then pivoted to their closed position shown in FIG. 5, and the bolt means 40 are tightened to clamp the housing to the valve body. The top member 35 is pivoted to its open position and the bonnet may be removed from the valve body by suitable tool means. The top member 35 is then pivoted downwardly to the closed position and locked into position, if desired, by suitable latch means (not shown). The fluid being emitted from the opening in the valve caused by the removal of the bonnet therefrom will impinge upon the closed internal surfaces of the housing and will fall by gravity into a container positioned therebeneath.

After the gasket has been replaced on the valve stem, the top member 35 is hingedly opened and the bonnet is replaced, whereupon the bolt means 40 are released and the closure plates 39 are open so that the housing may be freely lifted from the repaired valve.

While the housing side, end and top walls are preferably formed from metal, it is apparent that other materials such as wood, synthetic plastic, waterproof cardboard, and the like, could be used equally as well. It is also obvious that the various joints between the elements could be sealed by suitable sealing gaskets, if desired.

Thus it is apparent that according to my invention, a novel inexpensive apparatus has been provided which will permit the repair of valves in a fluid flow line without necessitating the cut-off of the fluid supply.

While in accordance with the patent statutes I have illustrated and described the best forms and embodiments of the invention now known to me, it will be apparent to those skilled in the art that other changes may be made in the apparatus described without deviating from my invention as set forth in the following claim.

I claim:

Apparatus for repairing a valve connected to a fluid supply conduit, said valve including a valve body having a bonnet connected thereto, comprising a rectangular housing having vertical front, rear and side walls, said rear and side walls being rigidly connected to each other to form a rigid generally U-shaped unit, said front wall being pivotally connected about a vertical pivot axis to a free vertical edge of a first one of said side walls, first latch means releasably locking said front wall in a closed position in contiguous engagement with the free vertical edge of the other of said side walls, a top member pivotally connected about a horizontal pivot axis to the upper edge of one of said side and rear walls, second latch means releasably locking said top member in a horizontal position in contiguous engagement with the upper horizontal edges of said side and rear walls and also upon the upper horizontal edge of said front wall when said front wall is in locked engagement with the other of said side walls, said rear wall having a slot in the lower central portion thereof extending upwardly from the lower edge of said rear wall, said slot being dimensioned to receive said fluid supply conduit when said housing is fitted downwardly upon said valve, closure plate means pivotally connected to said rear wall for closing the free portion of the slot below said conduit when said conduit is positioned adjacent the upper extremity of said slot, and means clamping the housing to the body of said valve comprising oppositely-arranged inwardly-directed bolt means threadably mounted in the side walls of said housing, the adjacent extremities of said bolt means being adapted to frictionally engage the body of the valve, whereby fluid emitted from the valve body when the bonnet thereof is removed will impinge upon the interior of the housing and will fall by gravity from the lower open portion thereof.

References Cited in the file of this patent

UNITED STATES PATENTS

| | | |
|---|---|---|
| 1,022,618 | Amend | Apr. 9, 1912 |
| 1,885,593 | Downer | Nov. 1, 1932 |
| 1,889,760 | Peters | Dec. 6, 1932 |
| 2,396,964 | O'Brien | Mar. 19, 1946 |
| 2,491,957 | Dilley | Dec. 20, 1949 |